Jan. 5, 1960   L. WIEDMANN ET AL   2,919,775
POSITIVE CLUTCH WITH PIN BLOCKS
Filed April 12, 1957
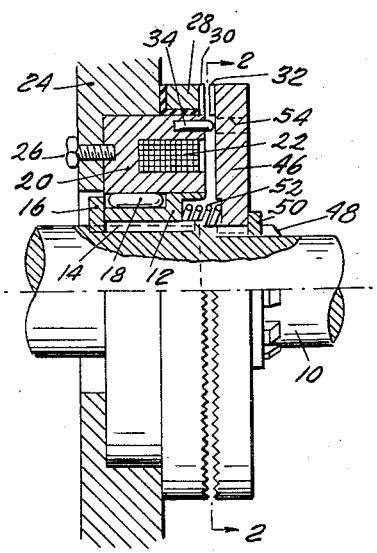
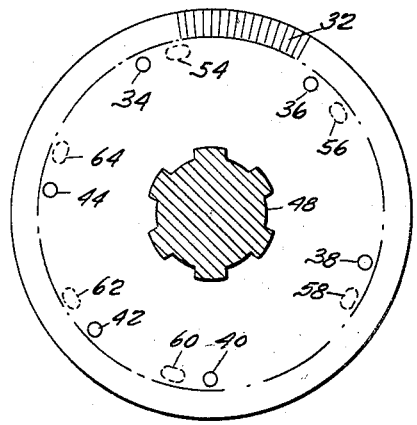
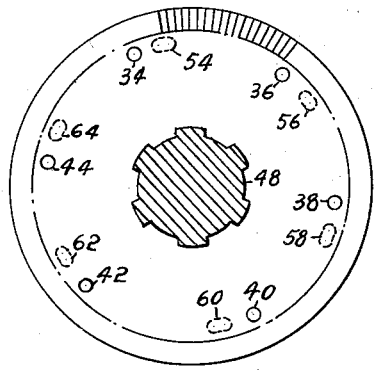
INVENTORS
LUDWIG WIEDMANN
HERMAN FISCHER
BY
ATTORNEYS United States Patent Office 2,919,775
Patented Jan. 5, 1960

2,919,775

POSITIVE CLUTCH WITH PIN BLOCKS

Ludwig Wiedmann, Friedrichshafen, and Herman Fischer, Friedrichshafen-Fischbach, Germany, assignors to I-T-E Circuit Breaker Company, Philadelphia, Pa., a corporation of Pennsylvania Application April 12, 1957, Serial No. 652,439

4 Claims. (Cl. 192—84)

This invention relates to a clutch device wherein the clutch members are engageable only after a predetermined amount of relative rotation for use in devices such as indexing and switching devices.

The principle of this novel invention is to provide keying means on the adjacent surfaces of cooperating clutch members wherein the keying means will allow clutch engagement only when the cooperating clutch members are in one or more predetermined angular relationships with respect to one another. By way of example, when our novel invention is applied to a formed-locked type clutch wherein one of the cooperating clutch members is a relatively stationary member and the other of the cooperating clutch members is a relatively movable member, the adjacent surfaces of the cooperating members may contain protruding pins and cooperating holes respectively wherein clutch engagement is possible only when the protruding pins are aligned with their cooperating holes.

If desired, the pins may all be provided in one of the surfaces and all of the holes provided in the opposite surface with the angular displacements between the pins defining the number of angular positions in which the clutch engagement may be achieved.

We have found it preferable to use at least three protruding pins distributed between the cooperating clutch surfaces so that when the pins are not aligned with their cooperating holes and a clutch engaging force is applied (which may be electromagnetic or any other desired type) there will not be a skewing or a shear stress applied to the clutch axial support members. In this particular example, if the three pins are distributed with any angular distribution other than 120° displacement from one another, there will be only one relative angular position between the clutch members at which the clutch members may engage. If, however, the three pins are distributed at exactly 120° displacement with respect to one another, then it is clear that there are three relative angular displacements between the three cooperating clutch members at which engagement is possible.

Clearly any desired number of pins, along with any angular distribution, may be utilized in order to adapt the clutch members for engagement at any relative single or plurality of predetermined angular positions.

Accordingly, the primary object of this invention is to provide a novel clutch device where engagement is possible only when the cooperating clutch members have predetermined angular displacements with respect to one another.

Another object of this invention is to provide a novel clutch device wherein keying means connected to the adjacent cooperating surfaces of the clutch members allow clutch engagement only when the clutch members have predetermined relative angular positions with respect to one another.

Another object of this invention is to provide a keying means which includes cooperating pins and holes in the adjacent surfaces of cooperating clutch members so that clutch engagement may be achieved only when the pins and holes of the adjacent surfaces of the clutch members are in alignment with one another.

These and other objects of this invention will become apparent from the following description when taken in connection with the drawings in which:

Figure 1 illustrates one embodiment of this novel invention in partially plan and partially cross-sectional views.

Figure 2 shows a view of Figure 1 taken across the lines 2—2.

Figure 3 is similar to Figure 2, but shows the pins and apertures being spaced at equal angles.

In the clutch embodiment of Figures 1 and 2, a rotatable shaft 10 has a bushing 12 keyed thereto by the keying means 14, the bushing being held in place by a retaining ring 16. Bushing 12 supports a needle bearing 18 which in turn rotatably mounts a magnetic structure which includes magnet body 20 and energizing winding 22. The magnet body 20 and its energizing winding 22 are then supported from a stationary support structure 24 by means of fastening screws such as the screw 26.

A ring 27 is then rigidly fastened to the magnet body 20, this ring 28 carrying a claw-tooth ring 30 which, as will be seen hereinafter, cooperates with an adjacent claw ring 32 to achieve clutch engagement. The surface of magnet body 20, which may be considered as comprising a part of one of the cooperating clutch members, includes therein a plurality of rigidly fastened pin members best seen in Figure 2 as pin members 34, 36, 38, 40, 42, and 44.

A cooperating clutch member comprising the armature member 46 is then splined to shaft 10 by splines such as spline 48 so as to be rotatable with shaft 10 but axially movable therewith. The axial motion of armature 46 is limited by a retaining ring 50 on one side and a biasing spring 52 which is seated in bushing 12 on the other side, the biasing spring 52 biasing armature 46 into engagement with the retaining pin 50.

The claw tooth ring 32 is then rigidly connected to the inner surface of armature 46 and is positioned in cooperating relationship with the claw tooth ring 30 of Figure 1. The armature disk 46 is further provided with a plurality of apertures 54, 56, 58, 60, 62, and 64 as best seen in Figure 2.

The angular distribution of apertures 54 through 64 in the armature disk 46 is identical to the distribution of pins 34 through 44 in the magnet body 20, this being best seen in Figure 2. Furthermore, the apertures 54 through 64 have a larger internal diameter than the external diameter of pins 34 through 44 so as to allow easy access of the pins to their cooperating apertures when these members are in alignment. Pins 34 through 44 may also have rounded edges to thereby allow easier entry of the pins into their cooperating apertures.

It is to be noted that the pins 34 through 44 and the apertures 54 through 64 form the keying means of this novel invention. However, it is clear that the same type of keying action could be obtained by controlling the respective diameters of the pins and apertures so that even though a pin and aperture are in alignment, the pin diameter may be too great to allow entrance thereof into that particular aperture. Furthermore, the pins and apertures may be distributed in any desired manner between the surfaces of the cooperating clutch members of Figures 1 and 2, as by having half the pin members on one surface and the other half on the opposite surface.

The only essential property which the keying structure is to impart to the clutch device is that when the pins and apertures are not in appropriate alignment to thereby indicate that the cooperating clutch members are not in predetermined angular relationships with respect to one another, that the cooperating claw tooth rings 20 and 32 will not be capable of being moved into engagement.

In operation of the clutch of Figures 1 and 2, when it is desired to stop the rotation of shaft 10 at some predetermined angular position with respect to the stationary member 24, the coil 22 is energized by some external power source (not shown), whereby a magnetic flux through the magnet body 20 completes a path through the magnetic armature member 46 to thereby attract armature member 46 to the left against the biasing force of spring 52.

If, as is shown in Figure 2 the armature member 46 is not in its predetermined angular position, the pins 34 through 44 will not be aligned with their cooperating apertures 54 through 64 respectively and the claw tooth rings 30 and 32 will not come sufficiently close to one another for engagement.

When, however, the armature 46 has rotated sufficiently to align the cooperating pins and apertures, the armature under the influence of the magnetic field of coil 22 will no longer be blocked and will rapidly be moved to a position where the claw tooth rings 30 and 32 engage to operatively connect shaft 10 to the stationary member 24 and achieve braking of the shaft 10 and any load attached thereto.

In the illustrated example, the arrangement of pins and holes is such that there is only one angular position at which clutch engagement is possible. It is, however, clear that by spacing the apertures and pins at equal angles, that as many as six possible angular positions for clutch engagement are possible.

Figure 3 shows an embodiment in which the apertures and pins are spaced at equal angles as described above.

In order to allow rapid action of the clutch members, the pins are so dimensioned that when they are not in alignment with their cooperating apertures, the teeth of the claw tooth rings 30 and 32 are slightly separated from one another and it is only necessary for these teeth to move a small distance in order to come into engagement with one another once the alignment position is achieved.

Furthermore, when alignment is achieved and the claw teeth 30 and 32 are engaged, the pins 34 through 44 project into their apertures 54 through 64 respectively for only a small distance and these pins do not take a part in the power transmission or the braking operation. That is, the pins and apertures merely operate as a keying means to allow the clutching medium to be operative or inoperative.

It may be further important in many applications that at least three pins distributed about the surface of one of the cooperating clutch members be utilized to prevent a tilting of the armature disk because of unsymmetrically distributed operating forces.

While in the foregoing, this novel invention has been described in conjunction with a formed-locked clutch for braking processes, it is to be understood that this invention could be applied to any clutch device where it is desired that the cooperating clutch members engage only at predetermined relative angular positions with respect to one another.

Thus, in an electromagnetic clutch utilizing interleaved laminations as the clutching medium, the clutching members can be provided with additional rings containing this novel keying means which prevents the compression of the laminations to thereby defeat clutch engagement until the keying means on the auxiliary members have reached their predetermined relative angular positions with respect to one another.

Although preferred embodiments of this invention have been described herein, many modifications and variations will now be obvious to those skilled in the art, and it is preferred therefore to be limited, not by the specific disclosure herein, but only by the appended claims.

What is claimed is:

1. In a clutch device comprising first and second adjacently positioned clutch members, said first and second clutch members being relatively rotatable with respect to one another, said second clutch member being axially movable into clutch engagement with respect to said first clutch member and means energizable for moving said second clutch member into said engagement with said first clutch member; a keying means for physically preventing engagement of said first and second clutch members until said members are in a predetermined angular position with respect to one another; said keying means comprising first keying members directly connected to said first clutch member and second keying members for cooperating with said first keying members directly connected to said second clutch member; said first and second keying members comprising pins and cooperating apertures respectively having identical angular distributions about their respective clutch members, said apertures having a circumferential dimension substantially larger than the circumferential dimension of said pins to provide a lost motion connection with respect to said pins, said clutch members being movable to said engagement only when each of said pins and apertures are aligned with one another; the torque transmitted by said clutch being transmitted through said first and second clutch members; said keying means being substantially independent of torque transmission duty.

2. In a clutch device comprising first and second adjacently positioned clutch member, said first and second clutch members being relatively rotatable with respect to one another, said second clutch member being axially movable into clutch engagement with respect to said first clutch member and means energizable for moving said second clutch member into said engagement with said first clutch member; a keying means for physically preventing engagement of said first and second clutch members until said members are in a predetermined angular position with respect to one another; said keying means comprising first keying members directly connected to said first clutch member and second keying members for cooperating with said first keying members directly connected to said second clutch member; said first and second keying members comprising pins and cooperating apertures respectively having identical angular distributions about their respective clutch members, said apertures having a circumferential dimension substantially larger than the circumferential dimension of said pins to provide a lost motion connection with respect to said pins, said clutch members being movable to said engagement only when each of said pins and apertures are aligned with one another; the torque transmitted by said clutch being transmitted through said first and second clutch members; said keying means being substantially independent of torque transmission duty, said pins and apertures being angularly distributed to provide only one angular position wherein each pin is aligned with a cooperating aperture.

3. In a clutch device comprising first and second adjacently positioned clutch member, said first and second clutch members being relatively rotatable with respect to one another, said second clutch member being axially movable into clutch engagement with respect to said first clutch member and means energizable for moving said second clutch member into said engagement with said first clutch member; a keying means for physically preventing engagement of said first and second clutch members until said members are in a predetermined angular position with respect to one another; said keying means comprising first keying members directly connected to said first clutch member and second keying members for cooperating with said first keying members directly connected to said second clutch member; said first and second keying members comprising pins and cooperating apertures respectively having identical angular distributions about their respective clutch members, said apertures being circumferentially elongated with respect to the diameter of said pins to provide a lost motion with respect to said pins when said pins enter respective apertures of said cooperating apertures, said clutch members being movable to said engagement only when each of said pins and apertures are aligned with one another; the torque transmitted by said clutch being transmitted through said first and second clutch members; said keying means being substantially independent of torque transmission duty, said pins and apertures being angularly distributed to provide a plurality of positions wherein each pin is aligned with a cooperating aperture.

4. In a clutch device comprising first and second adjacently positioned clutch member, said first and second clutch members being relatively rotatable with respect to one another, said second clutch member being axially movable into clutch engagement with respect to said first clutch member and means energizable for moving said second clutch member into said engagement with said first clutch member; a keying means for physically preventing engagement of said first and second clutch members until said members are in a predetermined angular position with respect to one another; said keying means comprising first keying members directly connected to said first clutch member and second keying members for cooperating with said first keying members directly connected to said second clutch member; said first and second keying members comprising pins and cooperating apertures respectively having identical angular distributions about their respective clutch members, said apertures being circumferentially elongated with respect to the diameter of said pins to provide a lost motion with respect to said pins when said pins enter respective apertures of said cooperating apertures, said clutch members being movable to said engagement only when each of said pins and apertures are aligned with one another; the torque transmitted by said clutch being transmitted through said first and second clutch members; said keying means being substantially independent of torque transmission duty, said energizable means comprising an energizing coil and magnetic circuit completed by said second clutch member; said first and second clutch members having cooperating claw tooth rings fastened thereto; said cooperating claw tooth rings being engageable only when said pins and apertures are aligned with one another; said clutch members being biased to a clutch disengaged position.

References Cited in the file of this patent

UNITED STATES PATENTS

| | | |
|---|---|---|
| 2,055,723 | Hope | Sept. 29, 1936 |
| 2,497,893 | Linahan | Feb. 21, 1950 |
| 2,603,327 | King | July 15, 1952 |

FOREIGN PATENTS

| | | |
|---|---|---|
| 25,644 | Great Britain | Nov. 21, 1902 |
| 643,494 | France | May 16, 1928 |